(12) United States Patent
Abraham et al.

(10) Patent No.: US 8,054,954 B1
(45) Date of Patent: Nov. 8, 2011

(54) ONE TOUCH VOICE MEMO

(75) Inventors: Cherian Abraham, North Ryde (AU);
Simon Boland, Pennant Hills (AU);
Karen El-Azzi, Abbotsford (AU); Paul McNamara, Sydney (AU); Ted Saoumi, Georges Hall (AU)

(73) Assignee: Avaya Inc., Basking Ridge, NJ (US)

( * ) Notice: Subject to any disclaimer, the term of this patent is extended or adjusted under 35 U.S.C. 154(b) by 1161 days.

(21) Appl. No.: 11/765,782

(22) Filed: Jun. 20, 2007

(51) Int. Cl.
*H04M 1/64* (2006.01)

(52) U.S. Cl. ............... 379/88.22; 379/88.01; 379/88.25; 379/142.06; 379/210.01; 379/88.14; 455/412.1; 455/417; 455/550.1

(58) Field of Classification Search ............ 379/88.01, 379/88.09, 88.22, 142.06, 88.14, 88.25, 210.01; 455/412.1, 550.1, 214.1, 417
See application file for complete search history.

(56) References Cited

U.S. PATENT DOCUMENTS

| | | | | |
|---|---|---|---|---|
| 5,586,172 A * | 12/1996 | Sakurai et al. | ............. | 379/88.09 |
| 6,029,063 A * | 2/2000 | Parvulescu et al. | ........ | 455/412.1 |
| 6,222,909 B1 * | 4/2001 | Qua et al. | .................. | 379/88.22 |
| 7,421,068 B2 * | 9/2008 | Lennox | ....................... | 379/88.25 |
| 7,489,767 B2 * | 2/2009 | Hikishima | ................. | 379/88.14 |
| 7,817,790 B2 * | 10/2010 | Sanmugasuntharam et al. | ........................ | 379/142.06 |
| 7,822,186 B1 * | 10/2010 | Boni | ........................ | 379/210.01 |
| 7,885,645 B2 * | 2/2011 | Postma et al. | ................ | 455/417 |
| 2003/0081739 A1 * | 5/2003 | Hikishima | ................. | 379/88.01 |
| 2007/0178934 A1 * | 8/2007 | Sun | ............................ | 455/550.1 |

OTHER PUBLICATIONS

Dial Dictate Phone Dictation System, NCH Swift Sound, retrieved from www.nch.com.au/dialdictate/index.html on Jun. 20, 2007, 4 pages.

* cited by examiner

*Primary Examiner* — Gerald Gauthier
(74) *Attorney, Agent, or Firm* — Sheridan Ross P.C.

(57) ABSTRACT

The present invention provides a method, device, and system for taking voice memos during a communication session. More specifically, voice memos may be taken using the same communication device that is used in the communication session. This can be accomplished by automatically muting the communication device and establishing a communication channel with another endpoint, such as a recording endpoint, to record audio signals transmitted by the communication device.

21 Claims, 5 Drawing Sheets

ONE TOUCH VOICE MEMO

FIELD OF THE INVENTION

The invention relates generally to communication systems and networks. More particularly, the invention relates to recording systems employed during a communication session.

BACKGROUND

Often times during calls, and especially during conference calls, some participants request to have the communication session recorded. Reasons for having a communication session recorded are many but may include that the requesting participant would like to review the conversation at a later time. Problems arise, however, if one or more other participants have objections to the conversation being recorded. In some countries recording a conversation without all of the participant's permission is illegal. Therefore, the requesting user cannot have the communication session recorded and will have to rely on handwritten notes or memory to recall the communication session.

While on a call users often want to take notes even if the communication session is being recorded. A user's notes often reflect their feelings, impressions, or reminders related to the communication session. Often times participants cannot record notes on a piece of paper and keep up with a communication session. It may be even more difficult to take notes if no piece of paper is available. Furthermore, any handwritten notes cannot be easily correlated to a particular point in the communication session to give the notes some sort of context. Accordingly handwritten notes tend to prove somewhat useless and cumbersome.

Another option to a communication session participant is to employ a Dictaphone to record their notes in an audio format. An advantage offered by the Dictaphone is that notes can be taken more quickly thereby allowing the participant to return to the conversation more quickly. However, the drawbacks of relying on a Dictaphone to take notes during a communication session are numerous. First of all, the participant must have a Dictaphone handy during the communication session. This is rarely the case. Second, the participant has to take precautions to ensure that the private memo being recorded to the Dictaphone is not transmitted as a part of the communication session, thereby interrupting the communication session. To accomplish this, the participant will either have to walk away from the communication device being used to participate in the communication session or hit the mute button on the communication device. Then, when the participant is done recording the audio memo, the participant has to remember to hit the mute button again to allow him/her to engage in the communication session.

One attempted solution to this problem is provided by DialDictate and includes the use of a PC based application that is allowed to connect with a telephonic communication device. DialDictate is an application that can be loaded onto a PC and when a participant makes a phone call using the PC, the application can record the full conversation between all participants. Unfortunately, DialDictate does not provide the ability to mute an outgoing stream during memo taking. Rather, memos can only be created using DialDictate in a very cumbersome way. A user would have to (1) put the other caller on hold, (2) make a call to DialDictate, (3) record a memo, (4) hang up to DialDictate, and (5) take the original caller off hold. Therefore, a participant would not be able to continue listening to a conversation if he/she were to break away and create a memo.

SUMMARY

These and other needs are addressed by various embodiments and configurations of the present invention. The present invention is directed generally to a system, device, and method for making voice notes or memos during a communication session.

In accordance with one embodiment of the present invention, a method is provided, the method generally comprising:

during a communication session between a first and second communication device, receiving a request to record a memo from the first communication device; and redirecting output signals generated by the first communication device from the second communication device to a recording destination, where the recording destination is adapted to record the redirected output signals generated by at least a first communication device in the form of a memo.

The memo may be recorded as audio and/or video data. Alternatively, the memo may be converted into a text version of the audio data and stored as text data. Still further in the alternative, the audio data may correspond to a set of instructions or macroinstructions for execution by a processor, in which case the memo may be recorded as the instructions. Of course, a memo may be stored in more than one of these formats depending upon how the memo was created. Furthermore, the memo does not need to be confined to any particular structure or configuration.

By allowing a communication session participant to quickly and only partially break away from the communication session to record a memo the participant is able to keep up with the communication session better and can record memos without interrupting the other participants. Furthermore, the ability to create a memo is not necessarily dependent upon the communication device being used by the participant. This allows participants to create memos during a communication session, even if they are not in their office or have a piece of paper handy.

Advantageously, the memo may be stored in an electronic format such that it can be integrated and used in various other platforms and applications such as email applications, calendar applications, text messaging applications and the like. This increases the utility of the memo greatly.

When the participant is done creating the memo, the participant may be returned back to the communication session. The transition between the communication session and the memo creating function is seamless providing additional efficiencies to the memo creation process.

The output signals of the communication device making the memos may be redirected by establishing another channel between the communication device and the recording destination. The second channel may be created using traditional telephony techniques that employ a call and answer protocol. However, if the communication device is SIP enabled, the functionality of SIP may make it especially easy to establish the second channel. The first channel is maintained in a uni-directional manner such that the participant can hear the communication session but the second channel is employed to carry output signals to the recording destination rather than the communication session participant. After the memo has been created, the second channel may be abandoned and the first channel may resume its bi-directional functions, thereby allowing the participant to engage in the communication session.

A "memo" as used herein may include a recording in the form of voice, video, text, and/or an executable instruction set. The memo may be self-addressed (i.e., set for replay to the creator of the memo) or addressed to another user. Memo's addressed to another user may comprise an instruction set causing the memo to be transmitted to the identified user after creation of the memo is completed. If the user is participating in the same communication session as the user that created the memo, then the memo may be sent to a voicemail, email inbox, or similar sort of message repository for later retrieval by the identified user. The instruction set included in a memo may also cause the creation of additional elements for a user such as calendar items in a calendaring application (e.g., appointments, reminders, and so on), emails, text messages, voice mails, and the like. Although described predominately as voice memos herein, one skilled in the art will appreciate that a memo created during a communication session may comprise any number of different messages retrievable by various media.

As used herein, a "message" comprises a unidirectional communication generated by a user. The message generally has an intended recipient or recipients, who may or may not differ from the generator of the message. That is, the message may be transmitted to another user, a predefined storage location, or may be a message to one's self. A communication session may, however, comprise multiple messages being transmitted and received simultaneously.

As used herein "user" or "participant" is used to refer to any person or thing that is capable of making use of and/or interacting with a communication device and generating a message thereby.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to take voice memos during a communication session.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof. Similarly, one or more functional portions of the system could be distributed between a server, gateway, PBX, and/or associated communication device.

Figure 1:
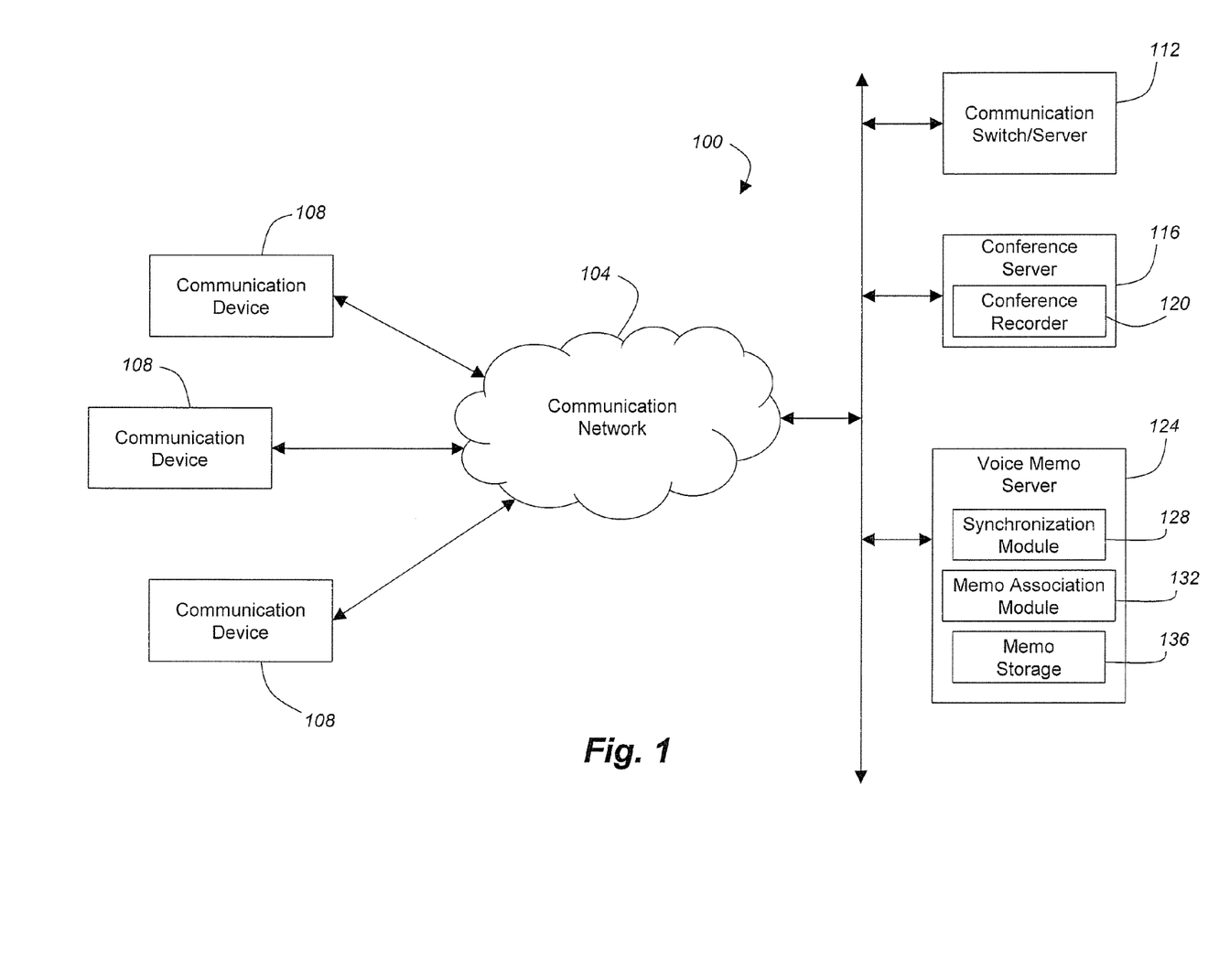
FIG. 1 is a block diagram depicting a communication system in accordance with embodiments of the present invention.

Referring initially to FIG. 1, a communication system 100 will be described in accordance with at least some embodiments of the present invention. The communication system 100 generally comprises a communication network 104, one or more communication devices 108, a communication switch/server 112, a conference server 116 including a conference recorder 120, and a voice memo server 124.

The communication network 104 may comprise any type of information transportation medium and may use any type of protocols to transport messages between endpoints. The communication network 104 may include wired and/or wireless communication technologies. Examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), the Internet, and any other type of packet-switched or circuit-switched network known in the art. In addition, it can be appreciated that the communication network 104 need not be limited to any one network type, and instead may be comprised of a number of different networks and/or network types.

The communication devices 108 may be packet-switched and/or circuit-switched and can include, for example, IP phones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, conventional wired or wireless telephones, cellular phones, and the like.

The communication switch/server 112 may comprise a dedicated processor that functions to provide services to client devices (e.g., communication devices 108). The communication switch/server 112 generally enables communications between two or more communication devices 108 connected to the communication network 104. The communication switch/server 112 may comprise any type of processing medium operable to perform instructions stored on an electronic data storage area.

The conference server 116 is generally adapted to provide a communication link between a large number (e.g., more than three or four) of communication devices 108. The conference server 116 is different from the communication switch/server 112 in that the communication switch/server 112 is generally designed to facilitate a communication session between two to three communication devices 108. Whereas the conference server 116 comprises the necessary hardware (e.g., mixers, conference bridge, etc.) that can allow a plurality of communication devices 108 to engage in a conference such as a teleconference, video conference, etc. The conference server 116 may also comprise a conference recorder 120 to record all or a portion of a conference between communication devices 108. The recorded audio and/or video portion of the conference may be stored in the conference server 116 or in a remote storage location for later reference by the conference participants. Of course, if one or more conference participants object to the contents of a conference being recorded, then the conference recorder 120 may be disabled for that particular conference.

The conference server 116 may be located on the same premises as the communication switch/server 112 or may reside in a remote location. Furthermore, in accordance with at least some embodiments of the present invention, the functionality of the conference server 116 may be incorporated into a communication switch/server 112 thereby obviating the need for a dedicated conference server 116.

The voice memo server 124 may be adapted to provide voice memo services to the communication devices 108 during a communication session. More specifically, the voice memo server 124 may be characterized by the ability to store voice memos and/or video memos of a session participant by establishing a side channel independent of the communication channel created between communication devices 108. The side channel may allow the user of a communication device 108 to record a memo during the communication session. The voice memo server 124 along with one or more communication devices 108 may be Session Initiation Protocol (SIP) enabled thereby making the creation of the side channel more efficient and easy. To facilitate this capability the voice memo server 124 may comprise a synchronization module 128, a memo association module 132, and a memo storage area 136.

The synchronization module 128 is adapted to synchronize a recorded memo and the corresponding recording of the communication session. By synchronizing the recorded memo and the communication session the recorded memo may be replayed in the context of the communication session. This feature may allow the user to better understand his/her memo. The synchronization module 128 may synchronize the two recorded streams in a number of different ways. For example, the synchronization module 128 may insert a pointer in the recorded communication session. The pointer can reference the memory location of the recorded memo and the location where pointer is inserted in the recorded communication session may substantially correspond to a point-in-time that the memo was recorded. In other words, when a participant engages the voice memo server 124 a pointer may be inserted into the recording of the communication session to reference the memo. In another example, the synchronization module 128 may insert a pointer in the recorded memo that references the communication session. The pointer may refer to the point-in-time substantially corresponding to the recording of the memo in the recorded communication session. The synchronization may also occur by actually inserting the recorded memo into the recorded communication session at the point-in-time where the memo was taken. The memo may be inserted using a stereo/multichannel approach, audio mixing, or simply inserting the memo audio into the conference audio. As can be appreciated by one skilled in the art, time stamps may also be employed to synchronize the recorded memo and the recorded communication session where a time stamp on the recorded memo may relate to a corresponding recording time of the communication session. When the particular time is crossed during playback of the communication session, the recorded memo may be prompted for playback as well.

The memo association module 132 serves to associate the recorded memo with the communication session, regardless of whether the communication session was recorded or not. When a memo is created, the creating participant may want to receive the memo when a certain event occurs. The memo association module 132 creates an association between one or more events and the recorded memo such that upon the occurrence of one or more of the events, the recorded memo is presented to the participant. Alternatively, an option to view or listen to the recorded memo may be presented to the participant. As an illustrative example, a participant may create a memo during a communication session between three other participants. The memo may relate to a reminder to discuss another topic with one of the three other participants, so the creating participant will likely want to receive the memo the next time he/she talks with the identified participant. The memo association module 132 may be adapted to create an association between the identified participant's phone number or another type of identifier (e.g., email address, extension, name, IP address, instant message (IM) identifier, and the like). Then, when the participant is about to contact the identified participant (e.g., due to an outbound/inbound call, outbound/inbound email, outbound/inbound IM, etc,), the recorded memo may be provided to the participant. Alternatively, the recorded memo may be provided during a conversation with the identified participant.

As can be appreciated by one skilled in the art, the association may also be created with all of the communication session participants rather than a subset of the participants. Furthermore, the association may be created between the recorded memo and the communication session itself. For instance, the recorded memo may be associated with the conference bridge number or participant code used during the communication session. After the communication session ends, one or more of the participants may access the recorded memos by referencing the communication session either by conference bridge number of participant code.

In accordance with at least some embodiments of the present invention, the memo association module 132 may also associate a recorded memo with one or more keywords. Then, if the keyword is spoken or otherwise transmitted to/from the participant that created the memo, then the memo may be provided to the participant. Alternatively, the association between the recorded memo and the keywords may require a certain threshold or concentration of keywords before the recorded memo is provided to the participant. This way the recorded memo is not provided in response to a single occurrence of a keyword. Rather, additional occurrences of the keyword will be required to ensure the conversation is related to the keyword and thereby warrants the retrieval of the recorded memo.

In accordance with at least some embodiments of the present invention, the memo association module 132 may further associate a recorded memo with calendar items in a user's calendar application. For instance, if the memo created includes an instruction set to add or reschedule a meeting, then the memo may be shared with the calendar application to update or create the necessary calendar items for the user. The types of calendar items that may be created or otherwise associated with a memo include current and future meeting reminders, self-reminders, to-do items, and the like. The memo may then be provided to the participant when the participant views the associated calendar item via the calendar application.

In accordance with other certain embodiments of the present invention, the memo association module 132 may associate a recorded memo with a new message. If the memo includes an instruction set to create and send a new message to a particular other participant, then after the memo has been created, a new message (e.g., text message, SMS message, email message, voice message, etc.) may be automatically generated such that when the participant is done with the communication session the participant is immediately reminded to finish and send the message. The contents of the message may also include contents of the memo in audio and/or text form.

The memo storage area 136 provides a remote storage location for memos created by participants to a communication session. By providing a remote storage location, a participant is not required to have a communication device 108 with memory capable of storing a recorded memo. Accordingly, a participant is allowed to create memos during a communication session regardless of the type of communication device 108 employed by the participant. This is especially useful in situations where the participant is utilizing a mobile communication device 108, such as a cellular phone, and wants to take a memo. Often times, users of cellular phones do not have paper handy to take a memo and their phone does not have the necessary memory to store the memo. The memo storage 136 provides the users of cellular phones to create and store memos during a communication session regardless of the memory present in the cellular phone. Although depicted in the voice memo server 124 the location of the memo storage 136 is allowed anywhere in the communication system 100. For instance, the memo storage 136 may reside on the conference server 116 or as a completely separate and dedicated data storage area.

The term "switch" or "server" as used herein should be understood to include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc.

It should be emphasized that the configuration of the servers 112, 116, 124 user communication devices 108, and other elements as shown in FIG. 1 is for purposes of illustration only and should not be construed as limiting the invention to any particular arrangement of elements.

Figure 2:
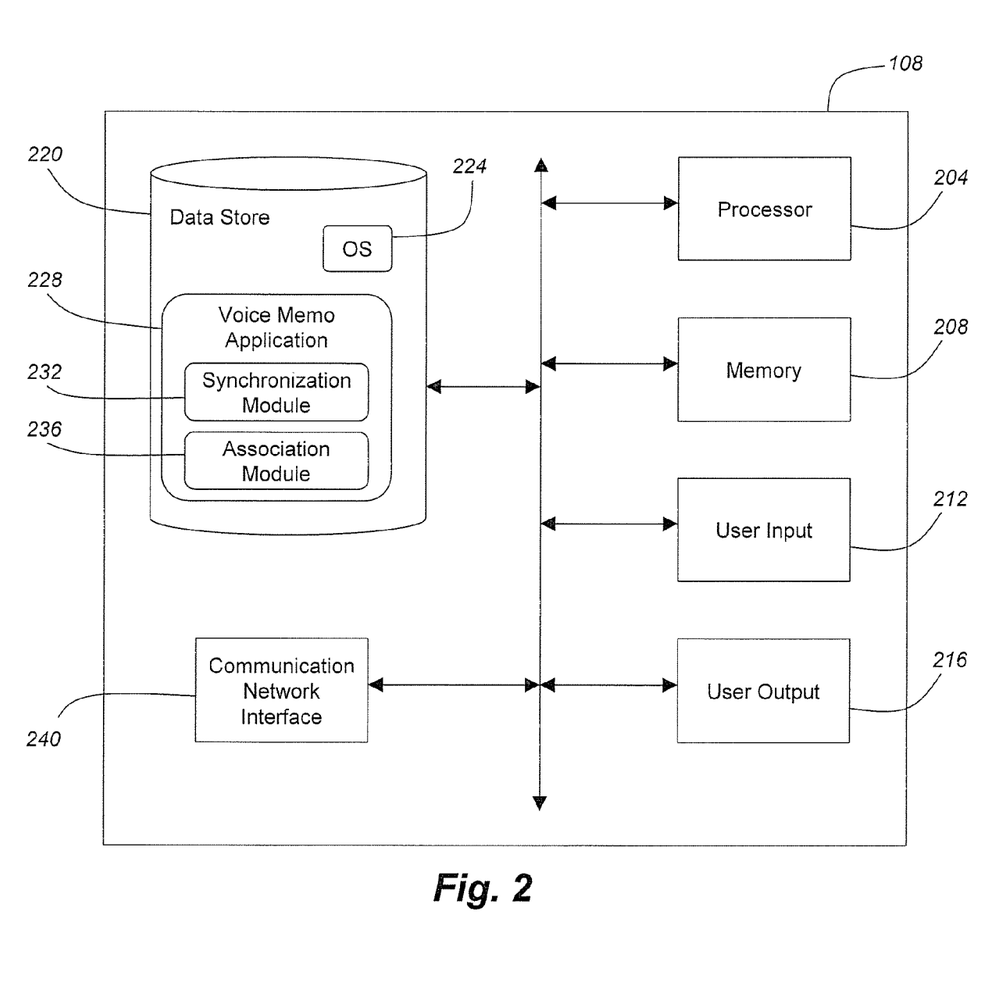
FIG. 2 is a block diagram depicting a communication device in accordance with embodiments of the present invention.

With reference now to FIG. 2, components of a communication device 108, such as a communications or computing device, are depicted in block diagram form in accordance with embodiments of the present invention. The components may include a processor 204 capable of executing program instructions. Accordingly, the processor 204 may include any general-purpose programmable processor, digital signal processor (DSP) or controller for executing application programming. Alternatively, the processor 204 may comprise a specially configured application specific integrated circuit (ASIC). The processor 204 generally functions to run programming code implementing various functions performed by the communication device 108.

A communication device 108 may additionally include memory 208 for use in connection with the execution of programming by the processor 204 and for the temporary or long-term storage of data or program instructions. The memory 208 may comprise solid-state memory resident, removable or remote in nature, such as DRAM and SDRAM. Where the processor 204 comprises a controller, the memory 208 may be integral to the processor 204. The memory 208 may be volatile and/or non-volatile memory.

In addition, the communication device 108 may include one or more user inputs 212 and one or more user outputs 216. Examples of user inputs 212 include, without limitation, keyboards, keypads, touch screens, touch pads, and microphones. Examples of user outputs 216 include, but are not limited to, speakers, display screens (including touch screen displays), and indicator lights. Furthermore, it can be appreciated by one of skill in the art that the user input 212 may be combined or operated in conjunction with a user output 216. An example of such an integrated user input 212 and user output 216 is a touch screen display that can both present visual information to a user and receive input selections from a user.

In accordance with at least some embodiments of the present invention, the user input 212 comprises a first user input such as a microphone that is adapted to convert voice signals into electrical signals for transmission across the communication network 104 as well as a second input such as a key, button, location on a touch screen or pad, or the like that is adapted to trigger the creation of a memo during a communication session. Engagement of the second input may cause the electrical signals generated by the first input to be transmitted to a recording destination rather than to the participants of the communication session.

A communication device 108 may also include data storage 220 for the storage of application programming and/or data. In addition, operating system software 224 may be stored in the data storage 220. The data storage 220 may comprise, for example, a magnetic storage device, a solid state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

The data storage 220 may further include a voice memo application 228. The voice memo application 228 is particularly useful for taking voice memos during a communication session but is equally useful for taking video memos, text memos, and the like. The voice memo application 228 may be engaged upon actuation of the second input described above. When the second input of the communication device 108 is activated the voice memo application 228 may cause the first input of the communication device 108 to send the received data to a recording destination. The recording destination of such signals may include the memo storage 136 of the voice memo server 124 and/or local memory 208. Use of the memory 208 as the recording destination may be preferred if the memory 208 is large enough to store memos because then the quality of the memo would not rely upon transmission of the signal across the communication network 104.

Additional functionality may be provided to the voice memo application 228 via a synchronization module 232 and/or association module 236. The synchronization module 232 is essentially a locally run version of the synchronization module 128 resident on the voice memo server 124. Likewise, the association module 236 is a local version of the memo association module 132 on the voice memo server 124. The synchronization module 232 may facilitate the synchronization of the recorded memo and a recording of the communication session. The association module 236, on the other hand, may be employed to create associations between the recorded memo and possible events thereby making access to the recorded memo more convenient.

The data storage 220 may also contain application programming and data used in connection with the performance of other functions of the communication device 108. For example, in connection with a communication device 108 such as a traditional telephone or IP telephone, the data storage 220 may include communication application software. As another example, a communication device 108 such as a Personal Digital Assistant (PDA) or a general-purpose computer may include a word processing application in the data storage 220.

A communication device 108 may also include one or more communication network interfaces 240. Examples of communication network interfaces 240 include, but are not limited to, a network interface card, a modem, a wired telephony port, a serial or parallel data port, radio frequency broadcast transceiver, a TJSB port, or other wired or wireless communication network interfaces.

Figure 3:
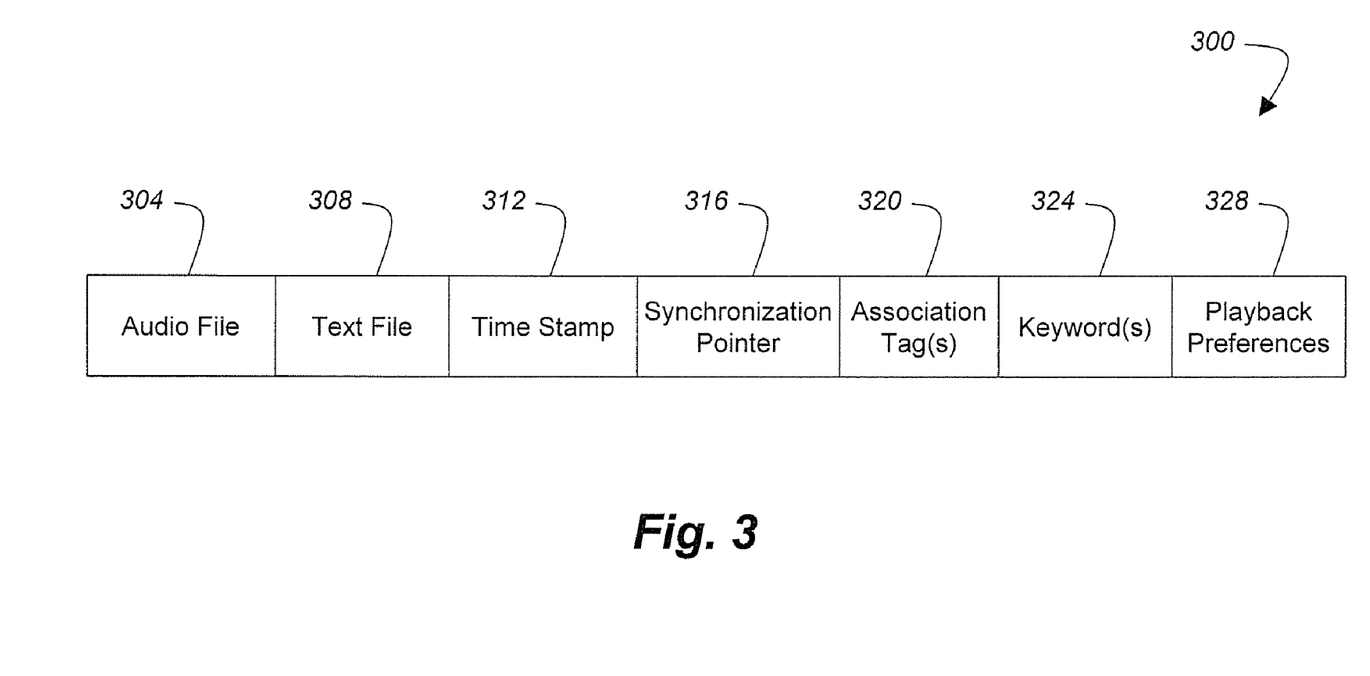
FIG. 3 is a data structure employed in accordance with at least some embodiments of the present invention.

FIG. 3 depicts a data structure 300 that may be employed in accordance with at least some embodiments of the present invention. The data structure 300 may comprise one or more data fields for storing data related to a recorded voice memo, such as a voice, video, and/or text memo that can be generated during a communication session. One field maintained by the data structure 300 may include an audio file field 304. The audio file field may be used to store the actual contents of the audio memo. Alternatively, the audio file field 304 may store the address of the memory location used to store the audio memo.

The data structure 300 may also comprise a text file field 308. The text file field 308 may comprise a speech-to-text conversion of the audio file. A text version of the recorded memo may be desirable to certain users with a preference to receive text memos instead of audio memos during playback of the actual memo. The text file field 308 may store the text file itself or an address of the memory location used to store the text file.

The data structure 300 may further comprise a time stamp field 312. The time stamp field 312 may comprise data related to the point-in-time that a particular memo was created. In accordance with at least one embodiment of the present invention, the time represented by the time stamp may correspond to the point-in-time when the second input of the communication device 108 was activated. Alternatively, the time stamp may correspond to the point-in-time when the memo was actually recorded. The time stamp may be an absolute time stamp indicating the time of day that the memo was created. In still other embodiments of the present invention, the time stamp may display an elapsed time since the beginning of the communication session.

Another field that may be included in the data structure 300 is a synchronization pointer field 316. The synchronization pointer field 316 may be used to store a pointer directed to the recorded communication session. More specifically, the pointer in the synchronization pointer field 316 may be directed to the point-in-time of the recorded communication session corresponding to the creation of the memo. Furthermore, in accordance with at least some embodiments of the present invention, two or more memos may be related in which case a pointer between memos may be provided as well in the synchronization pointer field 316.

An association tag field 320 may also be provided in the data structure 300. The association tag field 320 may store tags related to associations created by an association module 132, 236. The types of tags that may be maintained in the association tag field 320 include, without limitation, calendar item identifiers, message identifiers, participant identifiers, a participant phone number, and/or a communication session identifier. The association tag field 320 may also comprise restrictions for a given memo. For example, if the creator of a memo would like to allow some other users to access the memo, but not others, then the creator may include restrictions to the association tag field 320. The restrictions may define which particular users can and cannot access the memo as well as what types of communication devices are allowed to access the memo.

The data structure 300 may also include a keywords field 324. The keywords field 324 may be utilized to store one or more keywords that can be used to access the memo. In certain embodiments of the present invention, the keywords field and association tag field 320 are combined such that keywords are included as associations in the associations tag field 320. However, the two fields may be separated as depicted to provide a distinction between accessing a memo by keyword or by another type of association. The keyword field 324 may also comprise threshold data that identifies a predetermined threshold number of keyword references that have to occur for a memo to be referenced.

Yet another field that may be included in the data structure 300 is a playback preference field 328. The playback preference field 328 may be employed to store data describing how a particular memo should be replayed. The preferences may be user configurable and may vary from memo to memo. The preferences may define when a memo should be provided to a user (e.g., at beginning of a contact with an associated participant, during a contact with an associated participant, immediately after the communication session has ended, upon completion of the memo, upon redialing the conference bridge or participant code associated with the communication session, upon referencing a calendar item, and so on), how the memo should be performed or played back (e.g., by executing an instruction set, in text format, in an audio format, in a video format, in association with a calendar item, etc.), who the memo should be provided to (e.g., the creating participant, another identified participant, and/or any participant that accesses an element associated with the memo), and what the contents of the memo should include.

Figure 4:
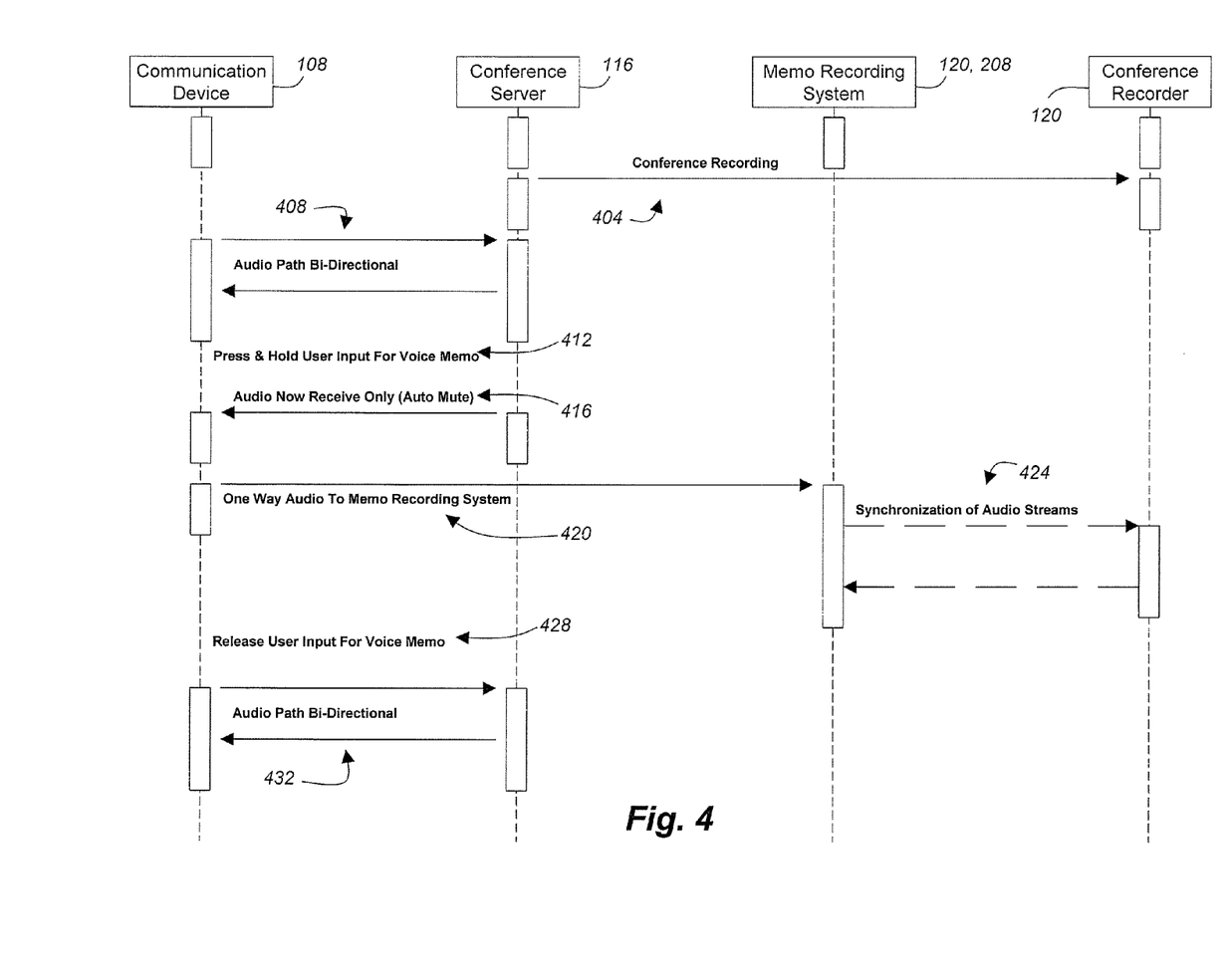
FIG. 4 is a flow chart depicting a method of taking a voice note or memo in accordance with at least some embodiments of the present invention.

Referring now to FIG. 4, the creation of a memo during a communication session will be described in accordance with at least some embodiments of the present invention. The method begins with a communication session between at least two participants. Typically, the two participants are each using a separate communication device 108 connected to one another via a first channel established over the communication network 104. The communication devices 108 may be IP enabled devices and therefore may have the capability to establish the first communication channel utilizing SIP. In accordance with at least some embodiments of the present invention, the participants may agree to have the communication session recorded for future references. If the participants agree to the recording of the communication session, then contents of all messages transmitted as a part of the communication session are recorded to the conference recorder 120 (step 404). The communication session is allowed to continue and the conference recorder 120 continues to store a copy of the messages transmitted as a part of the communication session.

During the communication session the communications between each participant and all other participants is bi-directional (step 408). In other words, each participant can hear all other participant and be heard by all other participants. During the communication session, the participant may speak into a first input of the communication device 108 (e.g., a microphone or the like) and hear other participants via an output such as a speaker. At some point during the communication session, however, a participant associated with one communication device 108 may determine that he/she would like to create a memo. When the participant desires to create a memo, the participant may engage the second input of the communication device 108 that triggers the creation of a memo (step 412). The engagement of the second input may be performed in a number of different ways. For instance, the participant may press and hold the second input for as long as the participant wants to record a memo. In other words, the participant may depress and continue depressing the second input for the duration of recording the memo. Conversely, the participant may press the second input once triggering the beginning of the memo and may then press the second input a second time to stop recording the memo.

Engaging the second input causes any audio signals received by the first input to be muted with respect to the communication session (step 416). Furthermore, the output of the first input is automatically redirected to a recording destination such as memo storage 136 and/or memory 208 (step 420). During the redirection step, a second channel is created between the communication device 108 and the recording destination. Similar to the first channel, the second channel may be established using SIP or any other channel creation technology. Furthermore, while the memo is being recorded, no signal is transmitted to other communication devices 108 over the first channel.

Automatically engaging a mute function with respect to the communication session and a memo creation function with the press of a single button is significantly easier than requiring a participant to first press a mute button then press a record memo button, although such an embodiment is also contemplated under the present invention. While the communication device 108 is in a memo creation stage, the electrical signals generated by the first input will continue to be transmitted to the memo recording system 120, 208 rather than to the participants of the communication session (e.g., via the conference server 116). In accordance with at least some embodiments of the present invention, while recording the memo, the first channel to the server 116 may still be bi-directional, although not depicted as such, in that electrical signals or packets may still be sent from the communication device 108 to the server 116. In this option, silence is sent to the conference server 116 so that the memo isn't heard by the other participants to the conference.

In addition to recording the memo, the synchronization module 128, 236 synchronizes the audio streams of the memo and the recorded communication session (step 424). The synchronization module 128, 236 may synchronize the audio streams with pointers in the recorded memo and/or the recorded communication session. Alternatively, the synchronization module 128, 236 may synchronize the recorded audio streams through the use of time stamps. The two recordings may continue to be synchronized as long as the memo is created. Furthermore, any creation of additional memos may also be synchronized relative to the recorded communication session and/or any previously created memos.

When the participant has completed the memo, the second input is released (or engaged a second time) thereby indicating to the communication device 108 that the memo function is no longer necessary (step 428). In response to ending the memo creation function, the signals generated by the first input (i.e., the microphone) are redirected back to the conference server 116 such that the other participants to the communication session can hear them. In this step, the second channel between the communication device 108 and the recording destination is abandoned and carries no further voice signals. Thereafter, the first channel is used as a bi-directional communications channel rather than a unidirectional channel (step 432). The communication session may then continue and any subsequent memos may be created by repeating steps 412 through 428. After the memo is created or after the communication session has ended, the participant may select the various associations for the memo. Alternatively, predefined user preferences may be used to automatically create the associations for the memo.

Figure 5:
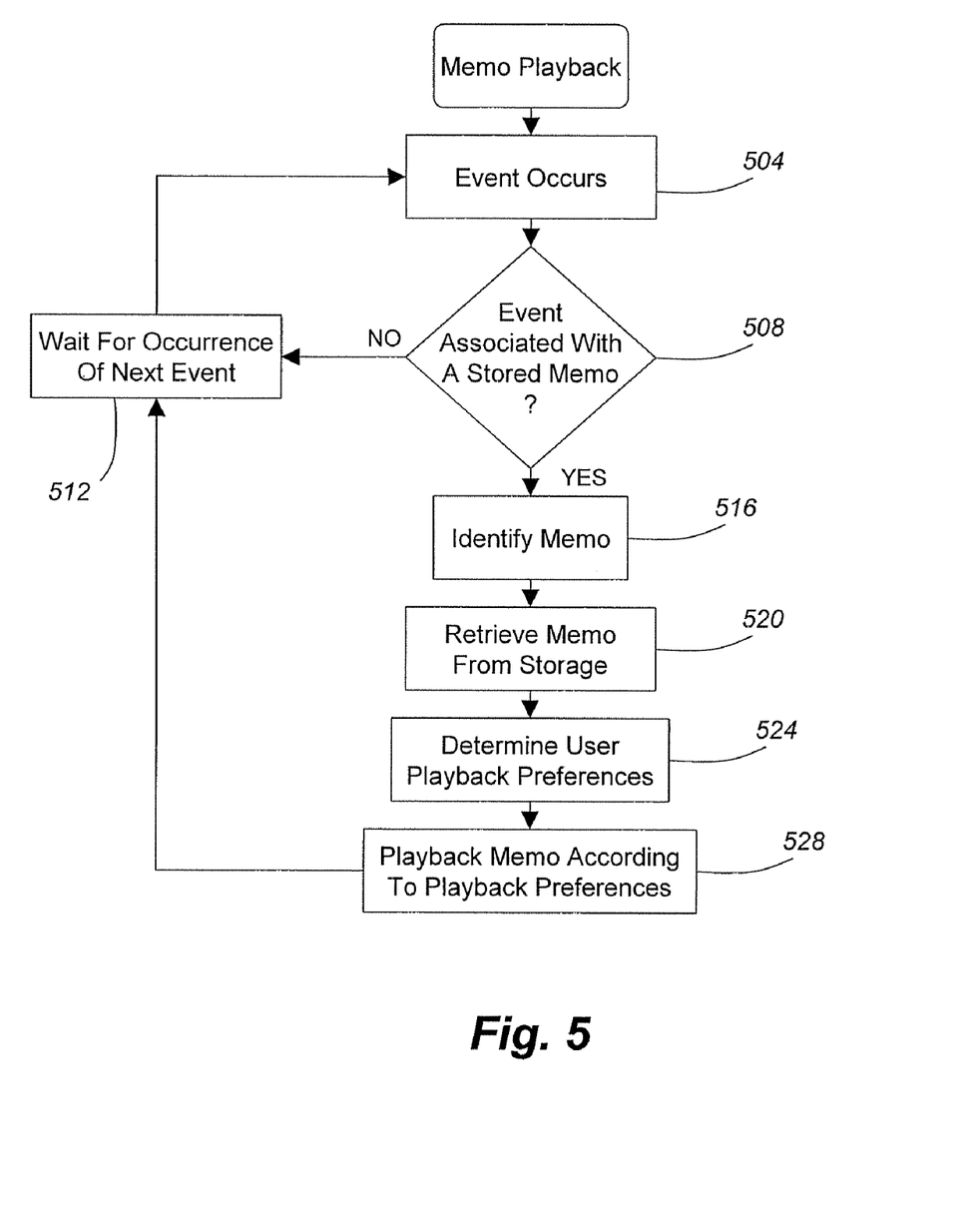
FIG. 5 is a flow chart depicting a method of playing back a recorded voice note or memo in accordance with at least some embodiments of the present invention.

Referring now to FIG. 5, a method of playing back a memo will be described in accordance with at least some embodiments of the present invention. The memo is usually replayed when an associated event occurs. Therefore, the method begins upon the occurrence of an event (step 504). The event may relate to an affirmative action, such as receiving a contact (e.g., call, email, text message, etc.), sending a contact, referencing a communication session, referencing a calendar item, and the like. Alternatively, the event may correspond to a predetermined amount of time after a particular action has occurred (e.g., a predetermined amount of time after the communication session has ended).

When the event occurs, it is determined if the event is associated with a stored memo (step 508). In other words, it is determined if there is an association created between the event and a stored memo. If there is no association between the event and a stored memo, then the method will wait until the occurrence of another event (step 512). Conversely, if it is determined that the event is associated with a stored memo, then the memo is identified (step 516). The memo may be identified by memory location, a communication session in which the memo was created, or a memo identifier. Once the memo has been identified, the memo is retrieved from its storage location (step 520). The memo may be retrieved from its recording destination (e.g., memo storage 136 or memory 208) or from a remote storage location.

Upon retrieval of the memo, the user playback preferences are determined (step 524). The playback preferences for a particular memo may vary from a simple replay of the memo to execution of instructions contained in the memo. In accordance with at least some embodiments of the present invention, the memo itself may just be played back without any accompanying content.

In accordance with at least some alternative embodiments of the present invention, the recorded memo may be replayed simultaneously with a recording of the communication session in which the memo was created. This particular type of playback will allow the receiving participant to receive the memo with some sort of context, which may give the memo more meaning. There are several ways in which a memo may be replayed simultaneously with a recording of the communication session. In one solution, the recorded memo may be played through one channel and the recorded communication session may be played through another channel creating a stereo effect. In another solution, the recorded memo may be played at a different volume than the recorded communication session. For example, the recorded memo may be played at a louder level than the communication session to allow the receiving participant to focus on the memo while still hearing the communication session. In still another solution, the recorded memo may be inserted into the recorded communication session at the point where it was created. Then the replay of the communication session may be interrupted to replay the memo.

There are still other types of playback preferences that may be defined in step 524. For instance, the memo may comprise a certain set of instructions or macroinstructions to perform a task on a communication device. Playback preferences may determine what subset of those instructions should be followed based on the participant that is receiving the memo. As an example, the memo may relate to prompting a participant to call back another participant after a communication session has ended. If the memo is created by a first participant and sent to a second participant during the communication session, then the memo may ask the second participant after the communication session has ended if they would like to call back the first participant. Alternatively, if the first participant is the receiving participant, then a call may be automatically placed to the second participant after the communication session has ended.

The playback preferences generally correspond to preferences of the participant that created the memo. However, in accordance with certain embodiments of the present invention, the playback preferences that dictate playback parameters of the memo may correspond to the receiving participant's preferences.

After the playback preferences have been determined, then the memo is played back for the participant based on the preferences (step 528). If there are no explicit playback preferences associated with the memo, then the memo may be played back in accordance with a set of default playback preferences. The memo may be played back via the media it was created in or via a different type of media. For example, if the memo was a voice recording, then the memo may also be played in an audio format. Alternatively, the memo may also be replayed in a text format or as a set of processor executable instructions. Once the memo has been played back, the method returns to step 512 to await another event.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, devices and methods for taking a voice note or memo during a communication session. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A communication method, comprising:
    during a communication session between at least first and second communication devices, receiving a request to record a memo from the at least a first communication device;
    during the communication session, redirecting output signals generated by the at least the first communication device from at least the second communication device to a recording destination, wherein the recording destination is adapted to record the redirected output signals generated by the at least the first communication device as a memo;
    in response to receiving the request to record an audio memo, automatically muting the output signals generated by the at least the first communication device for the at least the second communication device;
    establishing a second communication channel between the at least the first communication device and the recording destination; and
    using the second communication channel to carry the redirected output Signals to the recording destination.

2. The method of claim 1, wherein while the second communication channel carries redirected output signals, the output signals to the at least the second communication device are muted.

3. The method of claim 1, wherein the memo comprises at least one of audio data, video data, text data, and processor executable instructions.

4. The method of claim 1, wherein the recording destination resides locally with the at least the first communication device.

5. The method of claim 1, further comprising:
    recording the communication session in addition to recording the memo; and
    synchronizing the recorded communication session and the recorded memo.

6. The method of claim 5, wherein synchronizing comprises at least one of (i) inserting a pointer in the recorded communication session that references the recorded memo, wherein the pointer is inserted in the recorded communication session at a point-in-time substantially corresponding to the recording of the memo in the communication session and (ii) inserting a pointer in the recorded memo that references the point-in-time substantially corresponding to the recording of the memo in the recorded communication session.

7. The method of claim 1, further comprising:
    creating an association between the recorded memo and the communication session;
    referencing the communication session; and
    using the association between the communication session and the recorded memo to access the recorded memo.

8. The method of claim 7, wherein the association between the recorded memo and the communication session comprises at least one of a calendar item identifier, a message identifier, a participant identifier, a participant phone number, a communication session identifier, and a keyword.

9. The method of claim 1, further comprising replaying the recorded memo, wherein the recorded memo is replayed along with a recording of the communication session by at least one of:
    (i) inserting the recorded memo into the recorded communication session at substantially a point-in-time corresponding to the recording of the memo;
    (ii) concurrently playing the recorded communication session at a first volume level and the recorded memo at a second different volume level, wherein the recorded memo is replayed at substantially the point-in-time corresponding to the recording of the memo; and
    (iii) concurrently playing the recorded communication session via a first channel and the recorded memo via a second different channel, wherein the recorded memo is replayed at substantially the point-in-time corresponding to the recording of the memo.

10. A non-transitory computer readable medium comprising processor executable instructions operable to perform the method of claim 1.

11. A communication device, comprising:
    a first input adapted to receive and convert voice signals from a user to electronic signals for transmission to other communication devices participating in a communication session;
    a second input, wherein actuation of the second input by the user triggers the creation of a memo by muting the first input with respect to and during the communication session and redirecting, during the communication session the electronic signals created by the first input to a recording destination, wherein the recording destination is adapted to record the redirected electronic signals as a memo; and
    a synchronization module adapted to synchronize the memo and a recording of the communication session by at least one of (i) inserting a pointer in the recorded communication session that references the recorded memo, wherein the pointer is inserted in the recorded communication session at a point-in-time substantially corresponding to the recording of the memo in the communication session and (ii) inserting a pointer in the recorded memo that references the point-in-time substantially corresponding to the recording of the memo in the recorded communication session.

12. The device of claim 11, wherein the electronic signals created by the first input after actuation of the second input are transmitted to the recording destination via a second communication channel that is different from a communication channel used to participate in the communication session.

13. The device of claim 11, wherein the recording destination is not interacting in the communication session prior to actuation of the second input and wherein the recording destination comprises a memory of the communication device.

14. The device of claim 11, wherein the recording destination is remote with respect to the communication device.

15. The device of claim 11, further comprising a memo association module adapted to create an association between the recorded memo and the communication session that can be used as a reference to access the recorded memo, wherein the association between the recorded memo and the communication session comprises at least one of a calendar item identifier, a message identifier, a participant identifier, a participant phone number, a communication session identifier, and a keyword.

16. The device of claim 11, further comprising an output adapted to replay the recorded memo along with a recording of the communication session by at least one of:
    (i) inserting the recorded memo into the recorded communication session at substantially a point-in-time corresponding to the recording of the memo;

(ii) concurrently playing the recorded communication session at a first volume level and the recorded memo at a second different volume level, wherein the recorded memo is replayed at substantially the point-in-time corresponding to the recording of the memo; and (iii) concurrently playing the recorded communication session via a first channel and the recorded memo via a second different channel, wherein the recorded memo is replayed at substantially the point-in-time corresponding to the recording of the memo.

17. A communications system, comprising:

means for receiving a request from a first communication device to record a memo during a communication session between the first communication device and at least a second communication device;

means for redirecting output signals generated by the first communication device from the at least a second communication device to a recording destination, wherein the recording destination is adapted to record, during the communication session, the redirected output signals generated by the a first communication device as a memo; and means for replaying the recorded memo along with a recording of the communication session by at least one of:
  (i) inserting the recorded memo into the recorded communication session at substantially a point-in-time corresponding to the recording of the memo;
  (ii) concurrently playing the recorded communication session at a first volume level and the recorded memo at a second different volume level, wherein the recorded memo is replayed at substantially the point-in-time corresponding to the recording of the memo; and
  (iii) concurrently playing the recorded communication session via a first channel and the recorded memo via a second different channel, wherein the recorded memo is replayed at substantially the point-in-time corresponding to the recording of the memo.

18. The system of claim 17, wherein the means for redirecting comprises:

means for automatically muting the output signals generated by the first communication device with respect to the at least a second communication device;

means for establishing a second communication channel between the first communication device and the recording destination; and means for using the second communication channel to carry the redirected output signals to the recording destination.

19. The system of claim 18, wherein the means for establishing is adapted to establish the second communication channel using Session Initiation Protocol (SIP).

20. The system of claim 17, further comprising means for synchronizing the memo and the recording of the communication session, wherein the means for synchronizing employs at least one of (i) means for inserting a pointer in the recorded communication session that references the recorded memo, wherein the pointer is inserted in the recorded communication session at a point-in-time substantially corresponding to the recording of the memo in the communication session and (ii) means for inserting a pointer in the recorded memo that references the point-in-time substantially corresponding to the recording of the memo in the recorded communication session.

21. The system of claim 17, further comprising means for associating the recorded memo with the communication session, wherein the association created between the recorded memo and the communication session comprises at least one of a calendar item identifier, a message identifier, a participant identifier, a participant phone number, a communication session identifier, and a keyword.

* * * * *

UNITED STATES PATENT AND TRADEMARK OFFICE
CERTIFICATE OF CORRECTION

| | | |
|---|---|---|
| PATENT NO. | : 8,054,954 B1 | Page 1 of 1 |
| APPLICATION NO. | : 11/765782 | |
| DATED | : November 8, 2011 | |
| INVENTOR(S) | : Cherian Abraham et al. | |

It is certified that error appears in the above-identified patent and that said Letters Patent is hereby corrected as shown below:

At Column 15, line 28, please delete "Signals" and replace with --signals-- therein.

Signed and Sealed this
Sixth Day of November, 2012

David J. Kappos
*Director of the United States Patent and Trademark Office*